United States Patent
Karighattam et al.

(10) Patent No.: US 6,594,776 B1
(45) Date of Patent: Jul. 15, 2003

(54) MECHANISM TO CLEAR MAC ADDRESS FROM ETHERNET SWITCH ADDRESS TABLE TO ENABLE NETWORK LINK FAIL-OVER ACROSS TWO NETWORK SEGMENTS

(75) Inventors: Kishore Karighattam, Sunnyvale, CA (US); Sujalendu Das, San Jose, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 482 days.

(21) Appl. No.: 09/604,818

(22) Filed: Jun. 28, 2000

(51) Int. Cl.⁷ ............................................. H02H 3/05
(52) U.S. Cl. ........................ 714/4; 370/386; 714/11
(58) Field of Search ..................... 714/4, 11; 709/200, 709/223, 225, 227, 239; 370/469, 386, 395

(56) References Cited

U.S. PATENT DOCUMENTS

| | | | |
|---|---|---|---|
| 5,781,530 A | * 7/1998 | Segal | 370/220 |
| 5,978,373 A | * 11/1999 | Hoff et al. | 370/392 |
| 6,188,689 B1 | * 2/2001 | Katsube et al. | 370/389 |
| 6,226,677 B1 | * 5/2001 | Slemmer | 709/227 |
| 6,397,345 B1 | * 5/2002 | Edmonds et al. | 714/4 |
| 6,412,079 B1 | * 6/2002 | Edmonds et al. | 714/11 |

* cited by examiner

Primary Examiner—Dieu-Minh Le
(74) Attorney, Agent, or Firm—Davis Chin

(57) ABSTRACT

There is provided a communication network and method for enhancing server availability to client PCS which includes two Ethernet switches. Each one of the two Ethernet switches is connected to a corresponding one of the primary and secondary network interface cards in the file server PC. The two Ethernet switches are interconnected together through an uplink port. As a result, redundancy has been effectively and efficiently provided against the failure of either one of the two switches in order to enable link fail-over across two network segments.

2 Claims, 3 Drawing Sheets

MECHANISM TO CLEAR MAC ADDRESS FROM ETHERNET SWITCH ADDRESS TABLE TO ENABLE NETWORK LINK FAIL-OVER ACROSS TWO NETWORK SEGMENTS

BACKGROUND OF THE INVENTION

This invention relates generally to PC based networks used in business infrastructures that require high availability servers. More particularly, the present invention relates to a mechanism for improving server availability to a client personal computer which includes a file server personal computer having a pair of network interface cards, two Ethernet switches each being connected to a corresponding one of the network interface cards, and uplink ports for interconnecting the two switches.

In recent years, in light of the prevalence of server personal computer (PC) being employed in the business infrastructures there has arisen an ever-increasing need for high availability servers in networking. The failure of a server resulting in a downtime may affect loss of productivity and can sometimes even cause businesses to come to a grinding halt. As a consequence of the high power CPUs being built and the enhanced software and hardware architectures, server PCS are becoming increasingly more powerful and are a critical component of present network systems.

In a networked configuration, the server availability alone will not be sufficient enough. This is due to the fact that the link from the server PC to the network is equally important in order to insure overall reliability and availability of the server PC and the network. The network link connected to a server PC may become broken due to either a faulty network interface card (NIC), loose or broken cables, or a faulty switch.

This problem of providing a highly reliable network link to the server PC has been somewhat solved in the prior art by a server PC with primary and secondary links, as depicted in FIG. 1. Such a prior art server PC of FIG. 1 is shown in a publication by Advanced Micro Devices, Inc. entitled APermaNet™ Server: Advanced Server Availability and Performance Features on AMD=s PCnet™ Family of Ethernet Controllers@ which is hereby incorporated by reference. In particular, the networked client-server computer system 10 of FIG. 1 includes a plurality of client personal computers (PCS) 12a–12e which communicate with a file server PC 14 so as to access shared resources, for instance, a database file or a printer (not shown). The shared resources are commonly shared by the plurality of client PCS 12a–12e by way of an Ethernet hub/switch 16 that interconnects all of the client PCS.

A primary link or cable 18 has its one end 20 coupled to a first or primary network interface card (NIC) mounted within the file server PC 14 and its other end 22 connected to the Ethernet switch 16. In order to enhance network link availability, a secondary link or cable 24 is provided which has its one end 26 coupled to a second or redundant network interface card (NIC) in the file server PC and its other end 28 connected to the Ethernet switch 16. Under normal operation, the file server PC 14 uses the primary NIC and the primary link 18 to transmit and receive traffic. When the primary NIC fails and is unable to transfer data packets over the primary link 18 and the switch 16 to the client PCS, the redundant NIC will take over and is placed into service for performing the data transfer over the secondary link 24 and the switch 16. This operation is seamless and does not effect the normal network operation. When the primary NIC comes back on, the traffic is automatically switched from the secondary NIC/link 24 to the primary NIC/link 18.

Unfortunately, this prior fail-over solution suffers from the disadvantage that both the primary and secondary NICs are restricted to be connected at their ends 22, 28 to the same Ethernet hub/switch 16 in order for proper network operation. As a result, the Ethernet switch 16 has now become the single point of failure, which defeats the purpose of creating multiple segments (primary and secondary links) to the network server PC for high availability.

Accordingly, there still exists a need for a redundancy scheme which provides a way for a backup or redundant Ethernet switch to automatically and transparently take over the task of a failed primary Ethernet switch so that the client personal computer may continue to operate with a server personal computer without any disruptions of the network traffic.

SUMMARY OF THE INVENTION

Accordingly, it is a general object of the present invention to provide a communication network for enhancing server availability to client PCS.

It is an object of the present invention to provide a mechanism and method for clearing MAC address from Ethernet switch address table so as to enable network link fail-over across two network segments.

It is another object of the present invention to provide a communication network for enhancing server availability to client PCS which includes a second or redundant Ethernet switch so as to automatically and transparently take over the task of a failed primary Ethernet switch.

In a preferred embodiment of the present invention, there is provided a communication network for enhancing server availability to client PCS which includes a file server PC having a primary network interface card and a secondary network interface card configured as a fail-over pair. The primary and secondary network interface cards are programmed with a single MAC address. A first switch device is used to store initially the MAC address of the server PC in an address table. The first switch device is coupled to the primary network interface card via a primary link.

A plurality of client PCS are disposed in communication with the first switch device. One of the plurality of client PCS is in communication with the server PC through the first switch device in normal operation. A second switch device is provided which functionally replaces the first switch device when there is a failure in the first switch device and/or the primary link. The second switch device is coupled to the secondary network interface card via a secondary link. An uplink port is used for interconnecting the first and second switch devices so as to enable link fail-over from the one of the plurality of client PCS through the second switch device to the file server PC upon occurrence of the failure.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
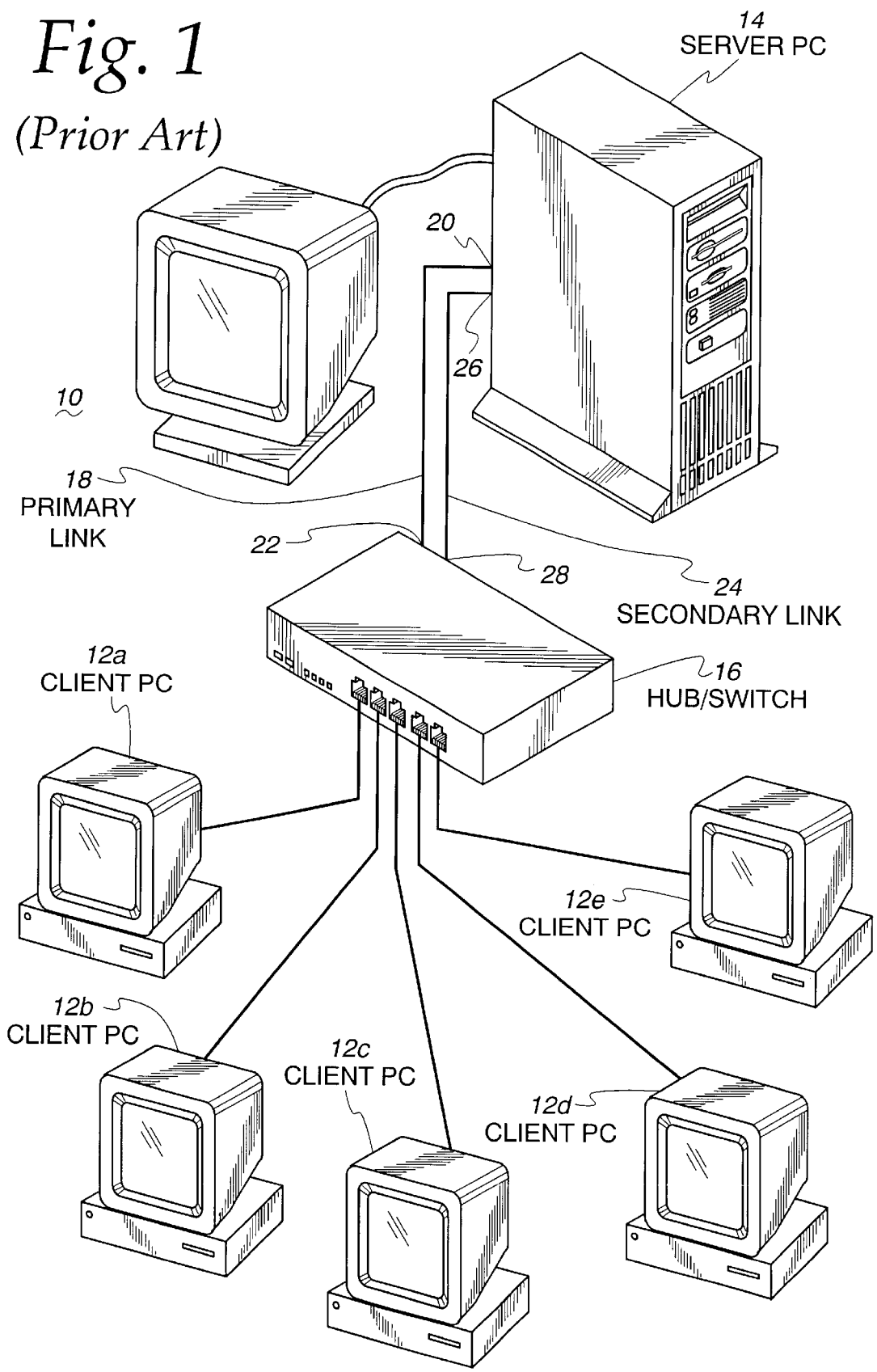
FIG. 1 is a graphical representation of a prior art networked client-server computer system.
Figure 2:
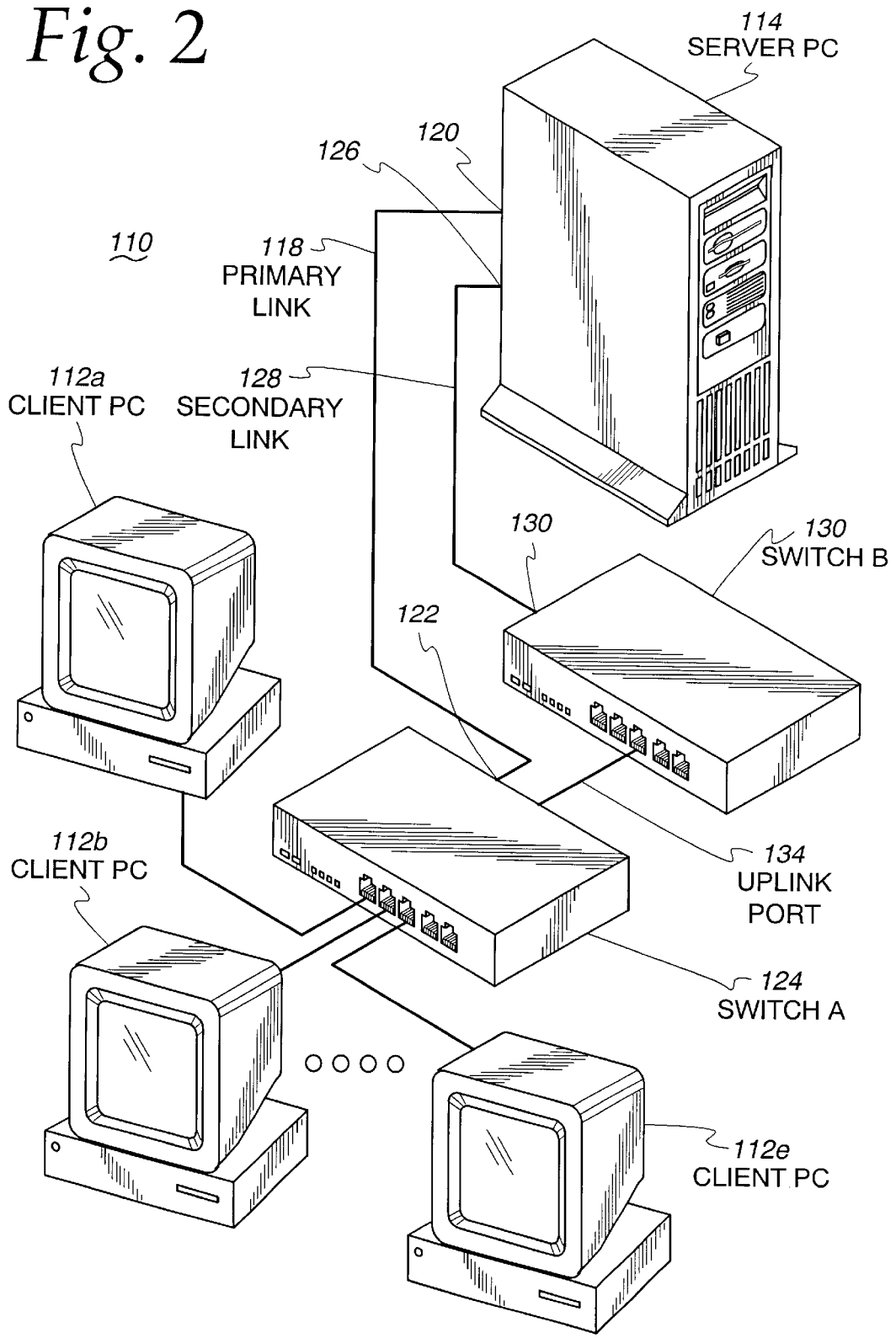
FIG. 2 is a graphical representation of a networked client-server computer system for enhancing server availability to client PCS, constructed in accordance with the principles of the present invention.

Referring now in detail to the drawings, there is shown in FIG. 2 a graphical representation of a net-worked client-server computer system 110 for enhancing server availability to client PCS, constructed in accordance with the principles of the present invention. The client-server computer system 110 includes a plurality of client personal computers (PCS) 112a–112e which communicate with a file server PC 114 so as to access shared resources. The server PC 114 has mounted therein first (primary) and second (default or redundant) network interface cards (NIC) configured as a fail-over pair. Both the primary NIC and the secondary NIC are programmed with a single, common media access control (MAC) address which is used to identify the server PC 114.

The primary NIC (not shown) mounted within the file server PC 114 is connected to one end 120 of a primary link or cable 118. The other end 122 thereof is joined to one end of a first Ethernet switch A (124). The secondary NIC (also not shown) mounted within the file server PC 114 is connected to one end 126 of a secondary link or cable 128. The other end 130 thereof is joined to one end of a second or backup Ethernet switch B (132). The Ethernet switches 124 and 132 are interconnected together through an uplink port 134. Each of the client PCS 112a–112e are interconnected to the other end of the Ethernet switch A (124).

In the normal operating condition, the Ethernet switch A (124) has initially stored in its address table the MAC address of the primary NIC. Therefore, the client PC 112a, for example, is able to be connected to the file server PC 114. In the event that the primary link 118 connected to the primary NIC should malfunction or fail, such as the cable or link being disconnected and/or the switch 124 failing, the secondary NIC will then take over. Further, the switch A (124) will delete the MAC address of the server PC 114 from its address table. As a result, the secondary NIC will send an LLC broadcast packet to the switch B (132).

Thus, the default or secondary Ethernet switch B (132) will add the server=s MAC address to its address table. Now, when the client PC 112a wants to send a packet to the file server PC 114, the primary Ethernet switch A (124) will not be able to find the MAC address in its table. As a consequence, the primary switch A will flood all of the ports as well as the uplink port 134. In this manner, unlike the prior art having a single Ethernet switch, the packet sent by the client PC 112a can then be received by the second or backup Ethernet switch B (132) in order to forward the same to the file server PC 114. Therefore, the client PC 112a is again able to be connected to the server PC 114.

Now if the primary link or cable 118 is re-connected or reinstated and/or the primary switch 124 is restored, the server PC software will switch control from the secondary NIC to the primary NIC. However, due to the fact that the secondary NIC remains connected to the backup Ethernet switch B (132) through the secondary link or cable 128, the backup switch B would still continue to have the MAC address of the server PC 114 stored in its address table. As a result, if the client PC 112a were connected to the backup switch B (132) it would not be able to be connected to the server PC 114 due to the fail-back process of the primary NIC. In view of this, when the server PC 114 completes the fail-back, the secondary NIC is also used to break the secondary link or cable 128 for a short period of time. In this fashion, the backup switch B will cause the MAC address of the server PC 114 to be deleted from its address table. As a consequence, the client server 112a will again be able to be connected to the server PC 114 via the primary switch A and the primary link 118.

Figure 3:
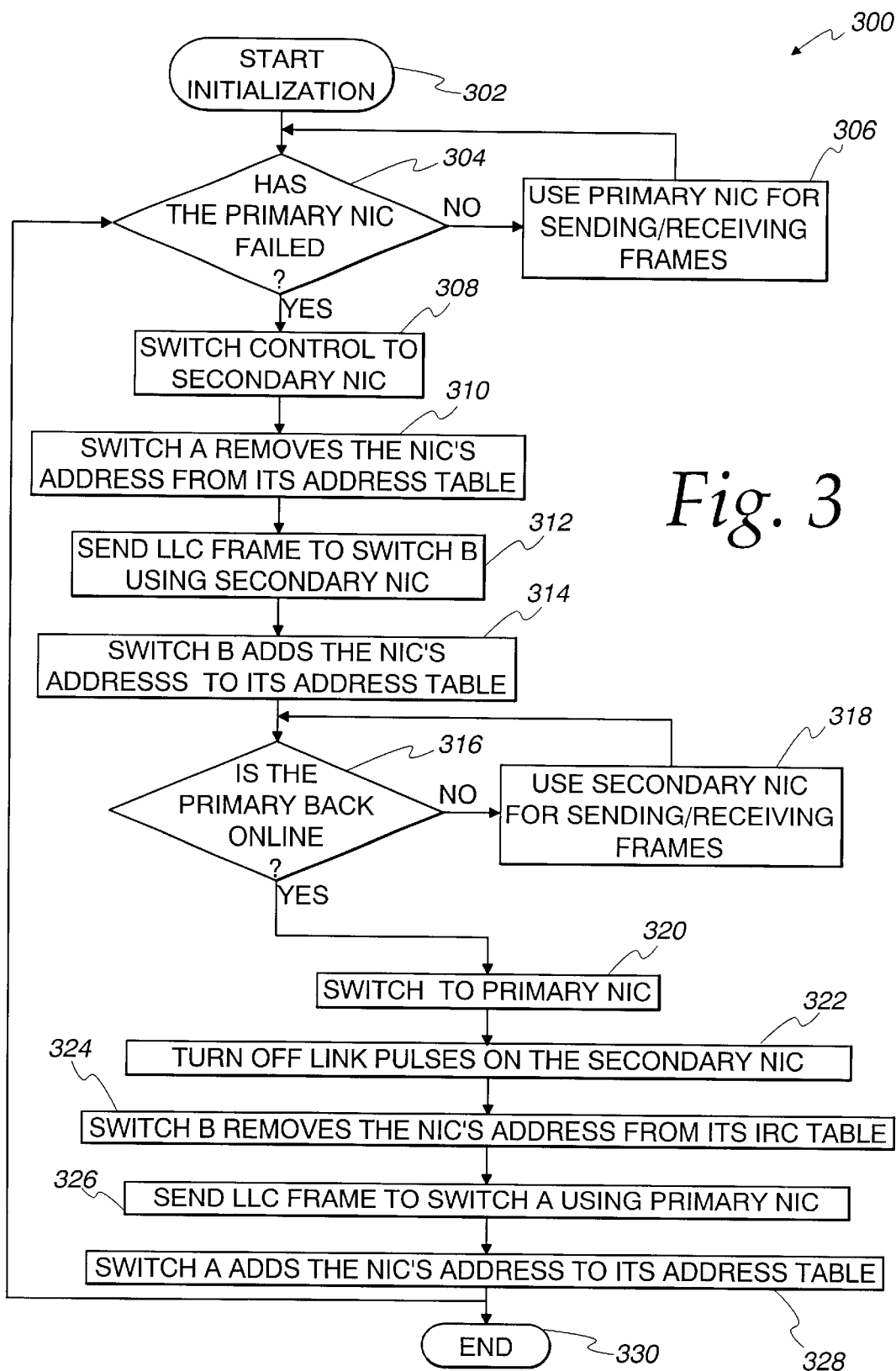
FIG. 3 is a flow chart which illustrates the fail-over process to the secondary switch B and the fail-back process to the primary switch A of FIG. 2.

In FIG. 3, there is depicted a flow chart 300 which illustrates the fail-over process where the secondary switch B becomes active when there is a failure in the primary link/switch A of FIG. 2. The process begins in the Start block 302 where there is an initialization of the network interface cards (NIC) and their associated drivers in the server PC 114. Initially, the primary NIC coupled via the driver and a physical layer to the primary link 118 is active, and the secondary NIC coupled to the secondary link 128 does not transmit or receive any frames. Since the primary NIC and the secondary NIC share a common MAC or physical address, the presence of the secondary NIC is hidden from the client PCS 112a–112e. Therefore, when the switch A (124) starts to receive frames from the primary NIC via the primary link. 118, it will add the MAC address to its address table.

In block 304, the driver monitors periodically the status of the primary link 118 in order to determine whether there is a failure in the primary NIC, primary link, or switch A. If the answer is "NO", then the process goes to the block 306 where the primary NIC is continued to be used for sending and/or receiving of the frames and is looped back to the block 304. If the answer is "YES" from the block 304, the process will proceed to block 308 in which the driver initiates a fail-over process by transferring control to the secondary NIC. Upon finding that there is a failure in the primary link 118 to the primary NIC, the primary switch A in the block 310 will remove the NIC's address from its address table.

Once the fail-over process has been completed and the secondary NIC is ready to take over the network traffic from the primary NIC, the driver in block 312 will send a broadcast LLC frame using the secondary NIC to the secondary link 128 and the switch B. In the block 314, when the switch B receives this LLC frame, it will add the MAC address to its address table. In block 316, the driver will continue to monitor periodically the status of the primary link 118 in order to determine whether the primary NIC is back on-line. If the answer is "NO", then the process goes to the block 318 where the secondary NIC is continued to be used for sending and/or receiving of the frames and is looped back to the block 316. If the answer is "YES" from the block 316, the process will proceed to block 322 in which the driver initiates a fail-back process by transferring control to the primary NIC.

Upon finding that the failure has been repaired, such as re-connecting of a disconnected cable or replacing the failed NIC with a new one (i.e., "Hot Swap" procedure), in the block 322 the link pulses being transmitted from the secondary NIC are then turned off for a short period of time which is accomplished by resetting a device in the physical layer. Since the device in the physical layer requires a certain amount of time before re-initialization, the link pulses will be turned off during this time interval. This causes the secondary switch B to assume that the secondary link 128 has failed. As a result, the secondary switch B in block 324 will remove the NIC's address from its address table.

Thereafter, the driver in block 326 will again send a broadcast LLC frame using the primary NIC to the primary link 118 and the switch A. In the block 328, when the switch A receives this LLC frame, it will add the MAC address to its address table again. Since the LLC (Logical Link Control) frame is broadcasted, the switch A (124) will forward the LLC frame to the switch B (130) via the uplink port 134. This causes the switch B to associate the server PC's MAC address with the uplink port 134 in its address table. As a result, if a client PC should be connected to the switch B, then such client PC would be caused to be connected to the server PC 114 via the uplink port 134, the primary switch A, and the primary link 118. The fail-back process is completed in the End block 330. However, the overall process is looped back to the block 304 as indicated by the line 332 in order to repeat the same.

From the foregoing detailed description, it can thus be seen that the present invention provides a mechanism and method for clearing the MAC address from the switch address table. This is achieved by the provision of two Ethernet switches each being connected to a corresponding one of the primary and secondary network interface cards in the file server PC. The two switches are interconnected together through an uplink port. As a result, redundancy is effectively provided against failure of either one of the two Ethernet switches so as to enable linked fail-over across the two network segments.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A communication network for enhancing server availability to client PCS, said communication network comprising:

a file server PC having a primary network interface card and a secondary network interface card configured as a fail-over pair, said primary and secondary network interface cards being programmed with a single MAC address;

a first Ethernet switch for initially storing the MAC address of said server PC in an address table;

said first Ethernet switch being coupled to the primary network interface card via a primary link;

a plurality of client PCS being disposed in communication with said first Ethernet switch;

one of said plurality of client PCS being in communication with said server PC through said first Ethernet switch in normal operation;

a second Ethernet switch for functionally replacing said first Ethernet switch when there is a failure in the first Ethernet switch and/or the primary link;

said second Ethernet switch being coupled to the secondary network interface card via a secondary link;

an uplink port for interconnecting said first and second Ethernet switch so as to enable link fail-over from one of said plurality of client PCS through said second Ethernet switch to said file server PC upon occurrence of the failure;

the MAC address stored in said first Ethernet switch being deleted upon occurrence of the failure and said secondary network interface card sending an LLC broadcast packet to said second Ethernet switch to cause the MAC address to be added in an address table in said second Ethernet switch so as to allow said one of said plurality of client PCS to be connected to the server PC via said uplink port, said second Ethernet switch, said secondary link, and said secondary network interface card; and said primary network interface card taking back control upon restoration of said first Ethernet switch and/or primary link that failed and said second Ethernet switch breaking said secondary link for a short period of time to cause the MAC address to be deleted from the address table of said second Ethernet switch, thereby providing a fail-back link from the said one of said plurality of client PCS to the server PC via said first Ethernet switch, said primary link, and said primary network interface card.

2. A method for enhancing service availability to client PCS in a communication network, said method comprising the steps of:

providing a file server PC with a primary network interface card and a secondary network interface card configured as a fail-over pair and programmed with a single MAC address;

providing a plurality of client PCS;

connecting initially one of the plurality of client PCS through a first Ethernet switch and a primary link to the primary network interface card of the file server PC in normal operation;

connecting said one of the plurality of client PCS through a second Ethernet switch and a secondary link to the secondary network interface card of the file server PC when there is a failure in the first Ethernet switch and/or the primary link; and interconnecting the first and second Ethernet switches through an uplink port so as to enable link fail-over from said one of the plurality of client PCS through the second Ethernet switch ,the secondary link, and the secondary network interface card to the file server PC upon occurrence of the failure; and reconnecting said one of the plurality of client PCS through the first Ethernet switch and the primary link to the primary network interface card of the file server PC when the first Ethernet switch and/or the primary link is restored in order to provide a fail-back link.

* * * * *